Figure 1:
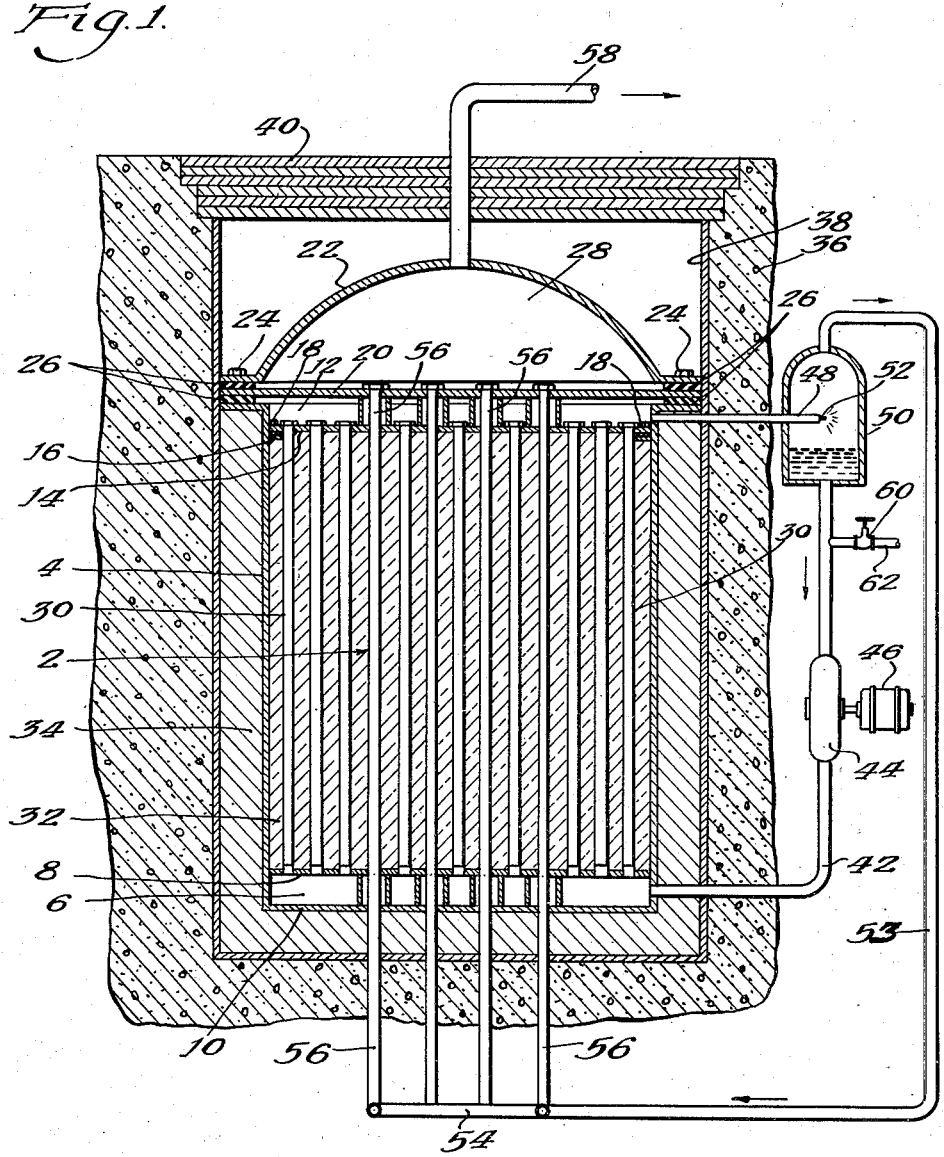

Sept. 17, 1957    E. P. WIGNER    2,806,820
NEUTRONIC REACTOR
Filed Aug. 18, 1947    2 Sheets-Sheet 2

Inventor:
Eugene P. Wigner
By
Robert A. Saunders
Attorney

United States Patent Office

2,806,820
Patented Sept. 17, 1957

2,806,820

NEUTRONIC REACTOR

Eugene P. Wigner, Oak Ridge, Tenn., assignor to the United States of America as represented by the United States Atomic Energy Commission Application August 18, 1947, Serial No. 769,301

2 Claims. (Cl. 204—193.2)

This invention relates to atomic power plants and more particularly to a novel method and means for producing steam by utilizing the heat of a nuclear fission chain reaction within a neutronic reactor.

In neutronic reactors, a neutron fissionable isotope such as $U^{233}$, $U^{235}$, or $94^{239}$ or mixtures thereof is subjected to fission by absorption of neutrons and a self-sustaining chain reaction is established by the neutrons evolved by the fissions. In general, such reactors comprise bodies of compositions containing fissionable material such, for example, as natural uranium, disposed in a neutron slowing material which slows the neutrons to thermal energies. The term "fissionable material" is used in the sense that it is understood by those skilled in the neutronic reactor art, namely materials that are fissionable by neutrons having thermal energies. Such a slowing material is termed a neutron moderator. Carbon and $D_2O$ (heavy water) are typical moderators suitable for such use. Heat is evolved during the reaction which is removed by passage of a coolant through the reactor or in heat exchange relationship therewith. Specific details of the theory and essential characteristics of such reactors are set forth in copending application of Enrico Fermi and Leo Szilard, Serial No. 568,904, filed December 19, 1944 now Patent No. 2,708,656.

In neutronic reactors, the ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently a system of finite size may be said to have a K constant, even though the value thereof would only exist if the system as built were extended to infinity without change of geometry or materials. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size, therefore, differs from K by the external leakage factor, and by a factor due to the neutron absorption by localized neutron absorbers, and the reproduction ratio must still be sufficiently greater than unity to permit the neutron density to rise exponentially with time in the system as built.

During the interchange of neutrons in a system of finite size, comprising bodies of any size disposed in a neutron moderator, neutrons may be lost to the chain reaction in four ways: by absorption or capture in the uranium content of the bodies without producing fission; by absorption or capture in the moderator material itself; by absorption or capture by the impurities present in both the uranium bodies and the moderator; and by leakage out of the system through the periphery thereof.

A general object of the invention is to provide a system, such as above described, wherein steam is produced by the heat of the chain reaction and is superheated thereby.

Another object of the invention is to vaporize a liquid by the heat of a nuclear fission chain reaction and to superheat the vaporized liquid by passing the same through the neutronic reactor in heat exchange relationship with a portion of the reactive composition.

A more specific object of the invention is to vaporize a liquid by passing the same through a neutronic reactor in heat exchange with the fissionable material therein, the vaporized liquid being superheated by passing through the neutron moderator, which is solid in form and is heated by the chain reaction to a relatively high temperature.

Still another object of the invention is to design a system, such as above described, wherein the neutron moderator is solid in form and the fissionable material is contained within hollow members through which a liquid is passed to be converted into steam by the heat of the chain reaction. In such an arrangement, the moderator is heated to very high temperatures and is effective to superheat the steam, which is conducted through the moderator in a suitable conduit or conduits.

Figure 2:
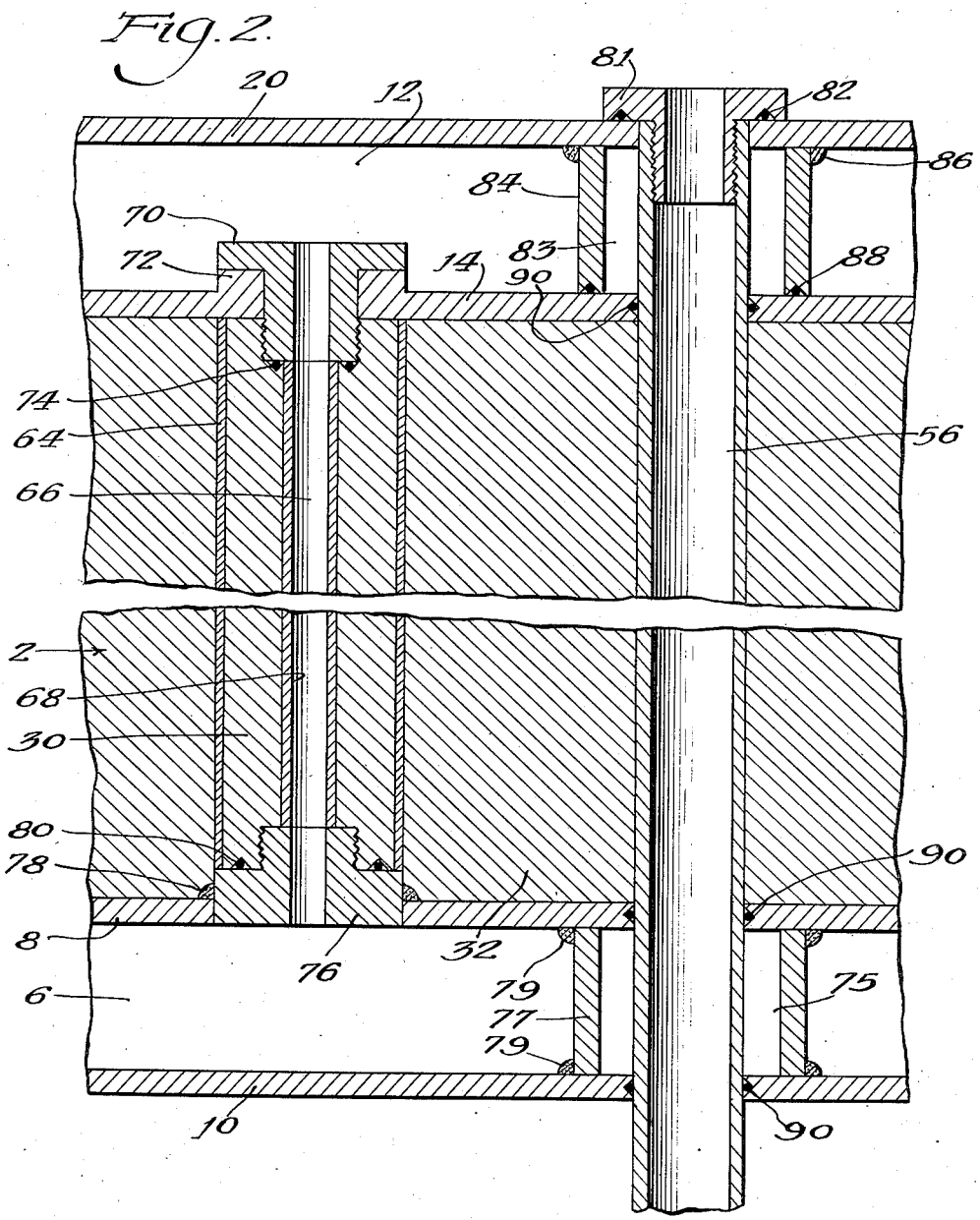

The foregoing and other objects and advantages of the invention will become apparent from a consideration of the following specification and the accompanying drawings, wherein:

Fig. 1 is a flow diagram of a system embodying the invention, the neutronic reactor being illustrated in central vertical section; and Fig. 2 is an enlarged fragmentary vertical section through the neutronic reactor illustrating in detail the construction thereof.

Describing the invention in detail, the neutronic reactor generally designated 2 is disposed within a preferably cylindrical pressure tank 4 of any suitable material, such as stainless steel or aluminum. At the bottom of the tank 4 is a fluid inlet chamber 6 defined by a plate or wall 8 of any suitable material, such as stainless steel and by the bottom wall or plate 10 of the tank 4. An outlet chamber 12 at the top of the tank is defined by a stainless steel plate 14 removably secured to an annular flange 16 therewithin as by stud bolts 18. The top of the chamber 12 is defined by a stainless steel plate 20, which is secured to the top of the tank 4 and to a steam dome 22 as by stud bolts 24, suitable packing being provided to afford a fluid-tight seal between the chamber 12 and the steam chamber 28 within the dome 22.

The reactor 2 comprises a plurality of aluminum coated uranium tubes 30 secured to the plates 8 and 14, as hereinafter described. The tubes 30 extend through a solid mass of neutron moderator 32 formed of any suitable neutron moderating material, such as graphite or beryllium. The tank 4 is disposed within a neutron reflector 34 of suitable neutrol moderating material, such as graphite or beryllium, adapted to decrease neutron losses from the periphery of the reactor, as more fully described in the above-mentioned co-pending application. The reflector 34 is contained within a concrete vault 36 having a stainless steel liner 38, the top of the vault being closed by a cover 40, preferably formed of alternate layers of iron and "Masonite" (compressed wood fiber). It will be understood that the vault 36 and the cover 40 afford a biological shield around the reactor 2 adapted to absorb biologically harmful emanations therefrom such as, for example, neutrons and alpha, beta and gamma rays.

As diagrammatically illustrated in Fig. 1, a liquid such as ordinary water is circulated through the uranium tubes 30 by means of an inlet line 42 comprising a pump 44 actuated by a motor 46. The discharge side of the pump 44 is connected through the pipe 42 to the before-mentioned inlet chamber 6 from which the liquid is conveyed upwardly through the uranium tubes 30 into the outlet chamber 12. The liquid is maintained under superatmospheric pressure in order to prevent vaporization within the reactor, since vaporization within the reactor has been found to produce deleterious effects on the controllability of the chain reaction. The liquid is preferably heated by the nuclear fission chain reaction and by heat exchange relationship with the tubes 30 to a temperature slightly in excess of 100° C. The neutron density within the reactor and consequently the temperature of the rods 30 are regulated by conventional means, such as neutron absorbent control rods (not shown), the neutron density being monitored by any conventional means (not shown), as more fully described in the previously-mentioned co-pending application.

The heated water passes from the outlet chamber 12 through an outlet pipe 48 into a steam chamber 50, the pipe 48 being provided with a suitable nozzle 52 to restrict the flow of water, and thus with the aid of the pump 44 and associated apparatus maintains the desired pressure within the reaction tank 4. It will be understood that as the heated water passes from the nozzles 52 into the low pressure steam chamber 50, the water is flashed into steam, which is conveyed through a line 53 into a steam inlet header 54. The header 54 is connected to a plurality of steam tubes or conduits 56 of any suitable material, such as stainless steel or beryllium having a relatively small neutron capture cross section. The steam is conveyed upwardly through the tubes 56, which pass through the neutron moderator 32 in heat exchange relationship therewith. Thus, the steam passing through the tubes 56 is superheated by heat developed within the neutron moderator as the result of the nuclear fission chain reaction; and the superheated steam passes through the tubes 56 into the steam chamber 28 within the dome 22 and outwardly therefrom through a steam outlet pipe 58 to be used for any desired purpose, such as the production of power. It may be noted that the water line 42 is connected to the bottom of the steam chamber 50 so as to drain therefrom any condensate, which may be formed from therewithin; and the water line 42 is also connected through a conventional shut-off valve 60 to a water make-up line 62.

Referring now to Fig. 2, it will be seen that each uranium tube 30, as above noted, is preferably enclosed within a thin aluminum sheath 64 and is provided with a central passage 66 having a relatively thin aluminum liner 68 therewithin.

The top of each uranium tube 30 is secured to the plate or wall 14 by means of a stud or nipple 70 bearing against a boss 72 on the plate 14 and threaded into the uranium tube 30, suitable packing 74 being provided to prevent water passing through the passage 66 from leaking into the moderator 32. The bottom of each uranium tube 30 is secured to the wall or plate 8 by means of a nipple 76 threaded into the tube 30 and secured as by welding at 78 to the wall 8. Suitable packing 80 is provided to prevent leakage of water into the moderator 32.

Each steam tube or conduit 56 extends through complementary openings in the walls 8 and 10 and is thermally insulated from the water inlet chamber 6 by means of a vacuum chamber 75 within an annular tube 77 secured to the walls 8 and 10 as by welding at 79, the chamber 75 being evacuated by any suitable means, such as a vacuum pump (not shown). Adjacent its upper extremity, the tube 56 extends through complementary openings in the plates 14 and 20 and is secured to the plate 20 by a stud or nipple 81 threaded into the tube 56 and carrying suitable packing 82 to afford a fluid-tight seal. The tubing 56 is insulated from the water within the chamber 12 by means of vacuum chamber 83 within a tube 84 secured as by welding at 86 to the plate 20 and bearing against the plate 14, the lower edge of the tube 84 carrying suitable packing 88 to afford a fluid-tight seal with the plate 14. The chamber 83 is preferably evacuated by any suitable means, such as a vacuum pump (not shown). It may be noted that the plates or walls 8, 10 and 14 are provided with suitable packing 90 engaging the tube 56 to afford a fluid-tight connection thereto.

Although the theories of nuclear physics set forth above are based on the best presently known experimental evidence, the invention is not limited thereto, inasmuch as additional experimental data later discovered may modify said theories.

It will be understood that the above-described embodiment of the invention is merely illustrative of the invention, inasmuch as many modifications will be apparent to those skilled in the art without departing from the spirit of the invention or the scope of the appended claims.

What is claimed is:

1. In a neutronic reactor having an active portion comprising a solid moderator, hollow fuel elements extending through said moderator, a pump connected to said hollow fuel elements and adapted to force a liquid therethrough, a nozzle exterior to said active portion and connected to said hollow fuel elements by conduit means, an expansion chamber associated with said nozzle in which the liquid may be vaporized and other conduit means connected to said expansion chamber, whereby the vaporized liquid may flow through the active portion so that the vaporized liquid is superheated thereby.

2. In a neutronic reactor having an active portion comprising a solid moderator, hollow fuel elements imbedded tightly within and extending through said moderator, a pump connected to said fuel elements to force a liquid therethrough, a nozzle connected to said hollow fuel element by conduit means, an expansion chamber associated with said nozzle wherein said liquid may be vaporized, and other conduit means connected to said expansion chamber whereby the vapor may flow through said active portion and said vapor may be superheated thereby.

References Cited in the file of this patent

UNITED STATES PATENTS

| 684,386 | Shaffer | Oct. 8, 1901 |
| 1,461,213 | Dravo | July 10, 1923 |
| 2,035,726 | Sheldon | Mar. 31, 1936 |
| 2,429,035 | Steving | Oct. 14, 1947 |
| 2,708,656 | Fermi et al. | May 17, 1955 |

FOREIGN PATENTS

| 125,433 | Great Britain | Apr. 24, 1919 |
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |

OTHER REFERENCES

Applied Atomic Power by E. S. C. Smith et al., Prentice-Hall, N. Y. (1946), pages 118–120, 122.

Goodman, "The Science and Eng. of Nuclear Power," vol. 1, page 275, Addison-Wesley (1947).

Kelly et al., Phy. Rev. 73, 1135–9 (1948).

Applied Nuclear Physics, 2nd addition by E. C. Pollard and W. L. Davidson; John Wiley & Sons, N. Y. (1951), pp. 256–257.